(12) United States Patent
Liao

(10) Patent No.: US 8,754,553 B2
(45) Date of Patent: Jun. 17, 2014

(54) VOICE COIL MOTOR HAVING SLOPED SURFACES

(75) Inventor: Chia-Hung Liao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 67 days.

(21) Appl. No.: 13/571,373

(22) Filed: Aug. 10, 2012

(65) Prior Publication Data

US 2013/0162058 A1   Jun. 27, 2013

(30) Foreign Application Priority Data

Dec. 21, 2011   (TW) .............................. 100147587 A

(51) Int. Cl.
   *H02K 41/03*   (2006.01)
(52) U.S. Cl.
   USPC ....................................... 310/12.16; 310/402
(58) Field of Classification Search
   USPC .............................. 310/12.16, 12.33, 89, 402
   See application file for complete search history.

(56) References Cited

U.S. PATENT DOCUMENTS

| | | | | |
|---|---|---|---|---|
| 7,964,999 | B2 * | 6/2011 | Liao | 310/12.16 |
| 8,232,688 | B2 * | 7/2012 | Huang | 310/12.16 |
| 2006/0214520 | A1 * | 9/2006 | Tseng | 310/14 |
| 2008/0036304 | A1 * | 2/2008 | Ho et al. | 310/12 |
| 2008/0164771 | A1 * | 7/2008 | Huang | 310/12 |
| 2010/0270870 | A1 * | 10/2010 | Liao | 310/12.16 |
| 2010/0277008 | A1 * | 11/2010 | Liao | 310/12.16 |
| 2011/0012439 | A1 * | 1/2011 | Liao | 310/12.16 |
| 2011/0241450 | A1 * | 10/2011 | Hsu | 310/12.16 |
| 2011/0249352 | A1 * | 10/2011 | Ku et al. | 359/824 |

* cited by examiner

*Primary Examiner* — Thanh Lam
(74) *Attorney, Agent, or Firm* — Novak Druce Connolly Bove + Quigg LLP

(57) ABSTRACT

An exemplary voice coil motor includes a base, a stationary magnetic field generator, a moveable magnetic field generator, and a case. The base includes a first surface defining a number of cavities. The stationary magnetic field generator is mounted on the first surface, and includes a supporting frame defining a first receiving space. The moveable magnetic field generator is moveably received in the first receiving space, and includes a core member. The core includes a lower surface. A number of flanges extend downwards from the lower surface, and received in a respective one of the cavities. Each of the flanges includes an end surface that is away from the lower surface. The end surface defines two symmetrical sloped surfaces respectively extending slantingly downward from the middle of the end surface to two opposite sides of the flange. The case receives the stationary magnetic field generator, the moveable magnetic field generator.

20 Claims, 7 Drawing Sheets

VOICE COIL MOTOR HAVING SLOPED SURFACES

BACKGROUND

1. Technical Field

The present disclosure relates to a voice coil motors and, particularly, to a voice coil motor having sloped surfaces on a core member of a movable magnetic field generator thereof.

2. Description of Related Art

With the development of optical imaging technology, camera modules are widely used in a variety of portable electronic devices, such as mobile phones and personal digital assistants (PDAs).

For example, third generation (3G) mobile phones include camera modules. The camera modules use actuators to provide zoom and auto-focus functions, and the actuators can, for example, be stepper motors. It is frequently necessary to use a gear assembly to transform the rotational movement of the actuator into linear movement. However, such gear assembly generally increases the bulk of the camera module. Furthermore, the occurrence of backlash or recoil in the gear assembly may degrade the focus accuracy.

Therefore, it is desirable to provide a voice coil motor which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
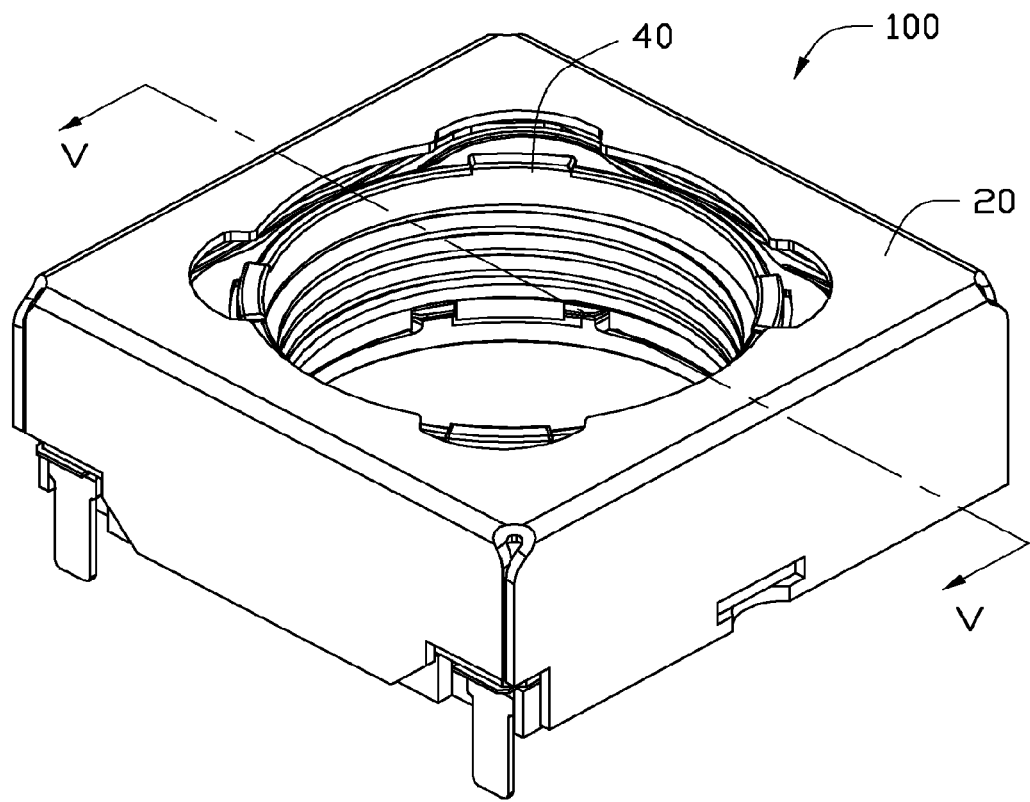
FIG. 1 is an assembled, isometric view of a voice coil motor, according to an exemplary embodiment.
Figure 2:
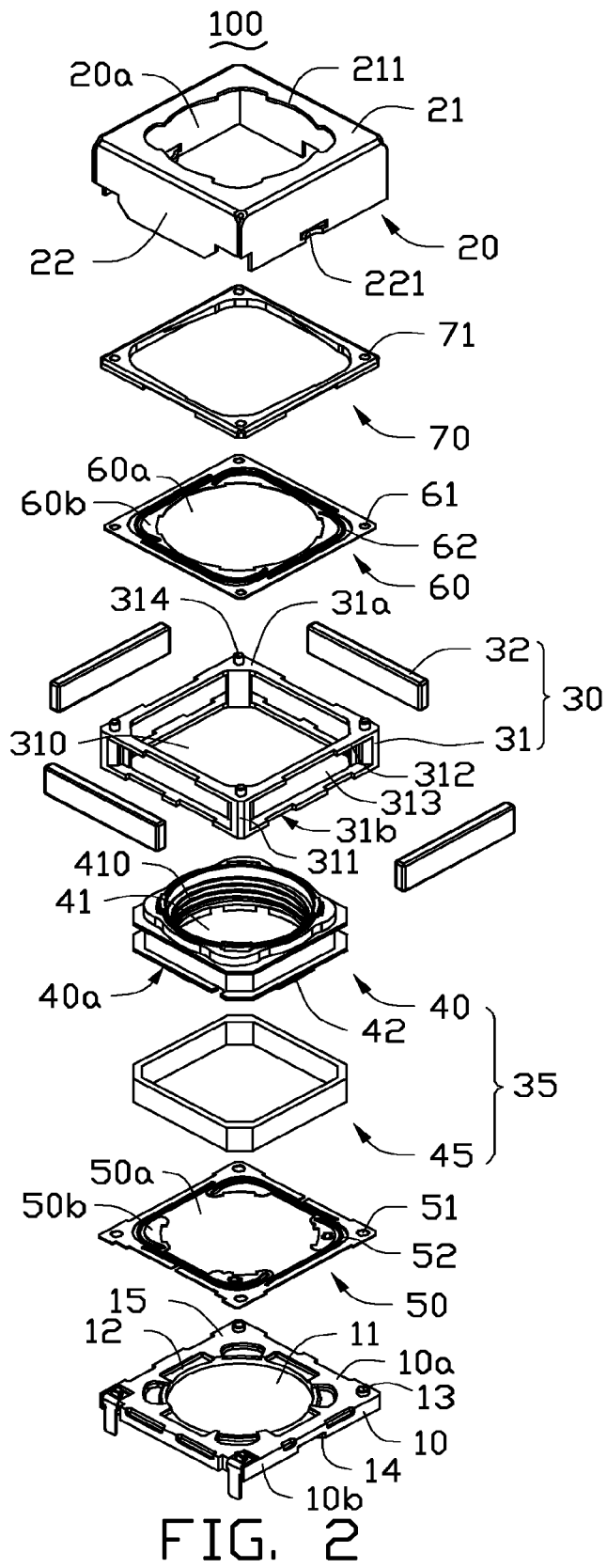
FIG. 2 is an exploded view of the voice coil motor of FIG. 1.
Figure 3:
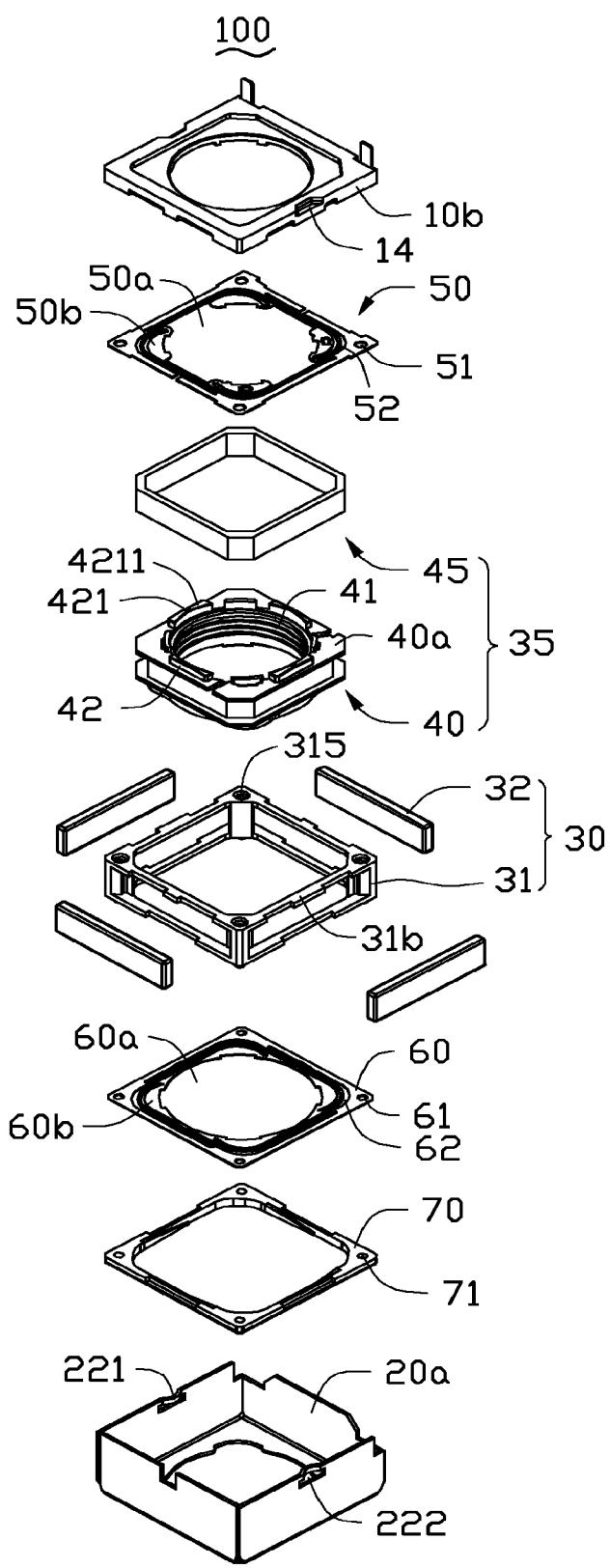
FIG. 3 shows the exploded voice coil motor of FIG. 2 inverted.

Referring to FIGS. 1-3, a voice coil motor (VCM) 100 according to an exemplary embodiment is shown. The VCM 100 includes a base 10, a case 20, a stationary magnetic field generator 30, a moveable magnetic field generator 35, a first elastic plate 50, and a second elastic plate 60.

The base 10 is made of plastic or resin and substantially cuboid, and includes a first surface 10a for supporting the stationary magnetic field generator 30. The base 10 defines a through hole 11 in a center of the first surface 10a, and four cavities 12. Each cavity 12 is located in a respective sidewall 15 of the base 10. The four cavities 12 surround the through hole 11, and each cavity 12 communicates with the through hole 11. Four lower alignment posts 13 perpendicularly extend upwards from four corners of the first surface 10a, respectively.

The base 10 also includes four side walls 10b perpendicular to and adjacent to the first surface 10a. In the embodiment, two of the side walls 10b oppose each other, and the other two side walls 10b oppose each other. For one of these pairs of side walls 10b, each side wall 10b defines a cutout 14.

The case 20 includes an upper plate 21 and four side plates 22. The upper plate 21 is substantially rectangular shaped. The four side plates 22 perpendicularly extend downwards from four sides of the upper plate 21, respectively. The upper plate 21 and the four side plates 22 cooperatively form a receiving room 20a, for receiving the stationary magnetic field generator 30, the moveable magnetic field generator 35, the two elastic plates 50, 60, and the base 10. A center of the upper plate 21 defines a circular first through hole 211, being coaxial with the through hole 11 of the base 10. Two of the side plates 22 oppose each other, and the other two side plates 22 oppose each other. For one of these pairs of side plates 22, each side plate 22 forms a projection 221 perpendicularly protruding inwards into the receiving room 20a. The projections 221 of the two opposing side plates 22 are aligned with each other. In one embodiment, each of the projections 221 is formed by stamping the corresponding side plate 22 inwardly, whereby the formed projection 221 defines a recess 222 therein. Each projection 221 is elastically movable away from and towards a central axis of the case 20, and spatially corresponds to a respective one of the cutouts 14 of the base 10. Each projection 221 snaps into a corresponding cutout 14, such that the stationary magnetic field generator 30 is fastened to the base 10.

In other embodiments, the four side plates 22 can have a total of only one projection 221; or one side plate 22 can have two or more projections 222. In each such case, the number and positions of the cutouts 14 correspond to those of the projections 222.

The stationary magnetic field generator 30 includes a supporting frame 31, and four permanent magnetic elements 32 mounted on the supporting frame 31. The permanent magnetic elements 32 are typically permanent magnets.

The supporting frame 31 is substantially cuboid, and defines a first receiving space 310. The first receiving space 310 is configured for receiving the moveable magnetic field generator 35. The supporting frame 31 includes four longitudinal beams 311 and eight latitudinal beams 312. Each two corresponding upper and lower latitudinal beams 312 are opposite to each other, and interconnect two corresponding adjacent longitudinal beams 311. The two longitudinal beams 311 and the two latitudinal beams 311 at each lateral side of the supporting frame 31 cooperatively form a first receiving recess 313. The first receiving recess 313 is in communication with the first receiving space 310. The permanent magnetic elements 32 are received in the first receiving recesses 2313, respectively, and are mounted to the peripheral sides of the supporting frame 31. Thereby, the permanent magnetic elements 32 serve as sidewalls of the stationary magnetic field generator 30.

The supporting frame 31 further includes four upper alignment posts 314 extending upward from four corners of a top surface 31a of the supporting frame 31, respectively, and four lower alignment holes 315 defined in four corners of a bottom surface 31b of the supporting frame 31, respectively. Each of the lower alignment holes 315 spatially corresponds to a respective one of the lower alignment posts 13 of the base 10.

Figure 4:
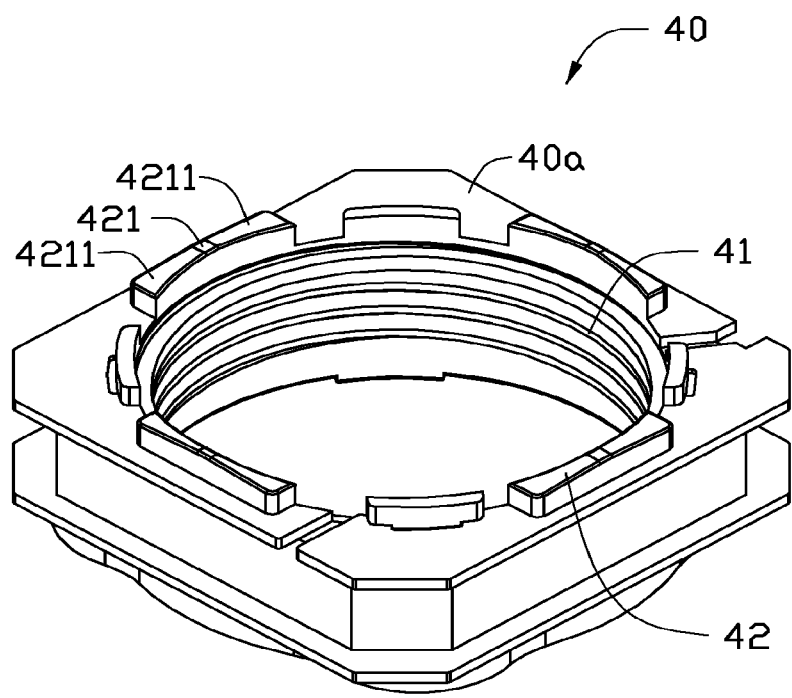
FIG. 4 is an assembled, isometric view of a moveable magnetic field generator of the voice coil motor of FIG. 3.
Figure 5:
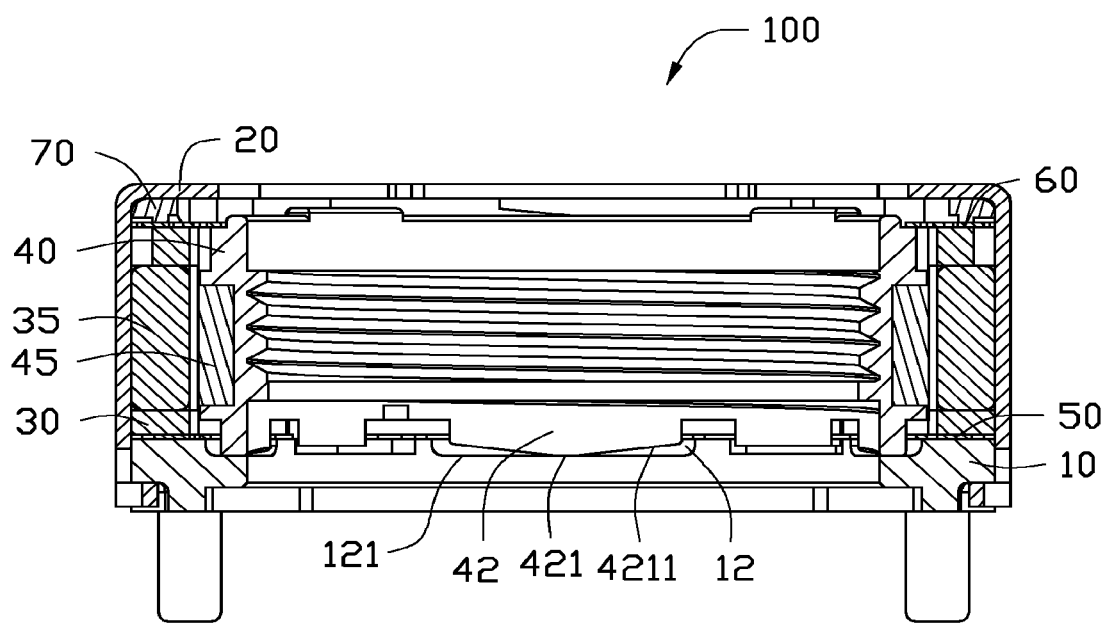
FIG. 5 is a cross-sectional view taken along line V-V of FIG. 1.

Also referring to FIGS. 4 and 5, the moveable magnetic field generator 35 is moveably received in the first receiving space 310. The moveable magnetic field generator 35 includes a hollow core member 40, and a coil 45 wrapped around the core member 40. The core member 40 defines a second receiving space 41 in a center thereof. The second receiving space 41 is configured for receiving a lens module (not shown), such that the lens module is held (fixed) in the core member 40. The shape of the second receiving space 41 is substantially cylindrical. The core member 40 has internal threads 410 formed on an internal wall thereof surrounding the second receiving space 41. The core member 40 includes a lower surface 40a facing toward the first surface 10a of the base 10. Four flanges 42 perpendicularly extend downwards from the lower surface 40a, and each of the flanges 42 spatially corresponds to a respective one of the cavities 12 of the base 10. The flanges 42 surround the second receiving space 41. Each of the flanges 42 includes an end surface 421 that is away from the lower surface 40a. The end surface 421 defines two symmetrical sloped surfaces 4211 extending slantingly upward from a middle portion of the end surface 421 to two opposite ends of the end surface 421, respectively. The sloped surfaces 4211 can not contact a bottom surface 121 of the corresponding cavity 12 of the base 10, and therefore the contact area between the flange 42 and the bottom surface 121 of the cavity 12 is reduced. In the embodiment, a range of an angle of each sloped surface 4211 is from 5 degrees to 45 degrees, as measured relative to a plane that is parallel to the lower surface 40a.

Figure 6:
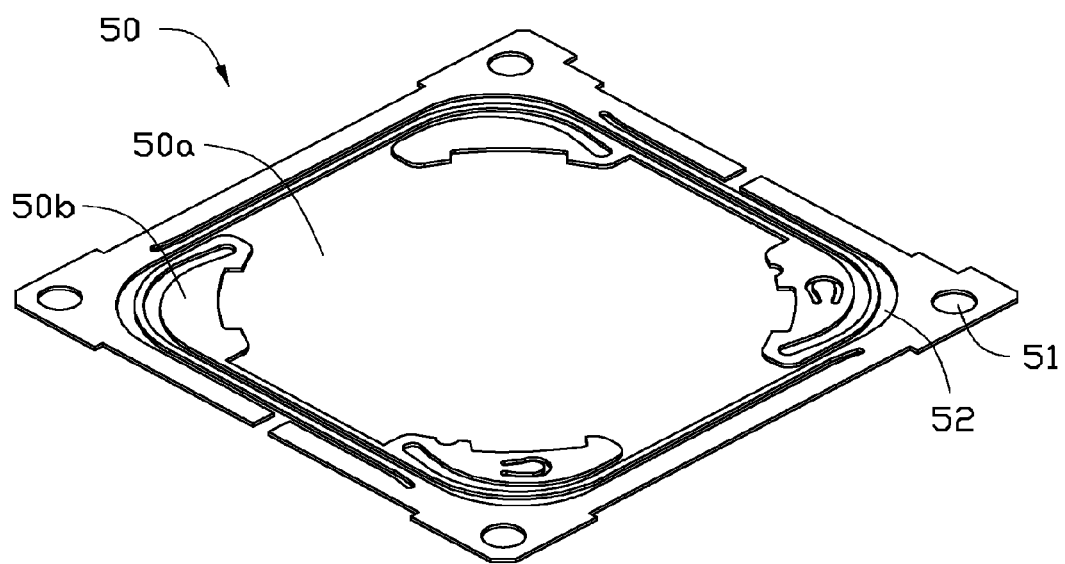
FIG. 6 is an enlarged view of a first elastic plate of the voice coil motor of FIG. 2.
Figure 7:
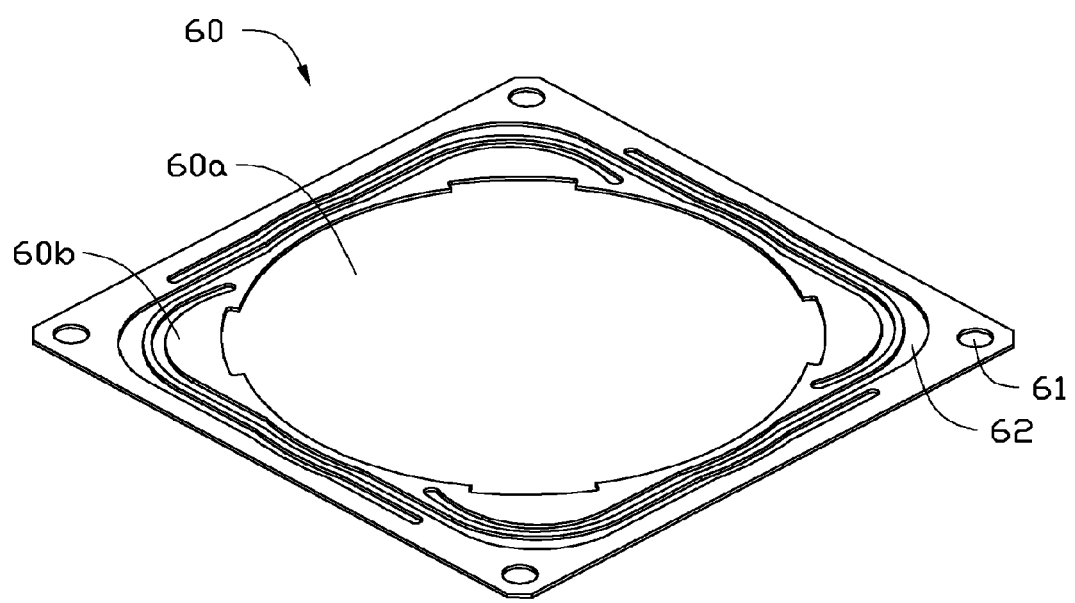
FIG. 7 is an enlarged view of a second elastic plate of the voice coil motor of FIG. 2.

Also referring to FIGS. 6 and 7, the first elastic plate 50 is stamped from a metal plate, which is substantially rectangular. The first elastic plate 50 is sandwiched between the base 10 and the supporting frame 31. The first elastic plate 50 defines a first light passing hole 50a substantially at the center thereof, and four first locating holes 51 at four corners thereof, respectively. Each of the four first locating holes 51 spatially corresponds to a respective one of the lower alignment posts 13 of the base 10. The first elastic plate 50 includes a first elastic portion 50b around the first light passing hole 50a. The first elastic portion 50b is substantially rectangular and defines a number of slots 52 around the first light passing hole 50a, thereby enabling the first elastic plate 50 to have elasticity.

The second elastic plate 60 is also stamped from a metal plate, which is also substantially rectangular. The second elastic plate 60 is mounted on the top surface 31a of the supporting frame 31. The second elastic plate 60 defines a second light passing hole 60a substantially at the center thereof, and four second locating holes 61 at four corners thereof, respectively. Each of the four second locating holes 61 spatially corresponds to a respective one of the upper alignment posts 314 of the supporting frame 31. The second elastic plate 60 includes a second elastic portion 60b around the second light passing hole 60a. The second elastic portion 60b is substantially rectangular and defines a number of slots 62 around the second light passing hole 60a, thereby enabling the second elastic plate 60 to have elasticity.

The VCM 100 further includes a bracket 70. The bracket 70 is also substantially rectangular shaped, corresponding to the shape of the upper plate 21. The bracket 70 is made of plastic and defines four upper alignment holes 71. Each of the upper alignment holes 71 is defined at a corner of the bracket 70 and passes through the bracket 70, and spatially corresponds to one of the upper alignment posts 314 of the supporting frame 30.

In alternative embodiments, the bracket 70 can be omitted to reduce the cost of the VCM 100.

In assembly of the VCM 100, the first elastic plate 50 is positioned on the base 10, with the four lower alignment posts 13 extending through the four first locating holes 51. The moveable magnetic field generator 35 is received in the first receiving space 310 of the supporting frame 31. The four lower alignment posts 13 of the base 10 are extended through the four lower alignment holes 315 of the supporting frame 31 and securely engaged therein. As such, the first elastic plate 50 is sandwiched between the base 10 and the supporting frame 31, and the four flanges 42 are received in the four cavities 12 of the base 10. The four upper alignment posts 314 of the supporting frame 31 are extended through the four second locating holes 61 of the second elastic plate 60 and securely engaged in the four upper alignment holes 71 of the bracket 70. As such, the second elastic plate 60 is sandwiched between the bracket 70 and the supporting frame 31.

The assembled stationary magnetic field generator 30, the moveable magnetic field generator 35, the elastic plates 50, 60, the bracket 70, and the base 10 are all received in the case 20, with each of the projections 221 snappingly engaged in a respective one of the cutouts 14 of the base 10. As such, assembly of the VCM 100 is completed.

In use of the VCM 100, when applying current to the coil 45, magnetic driving forces between the permanent magnetic elements 32 and the coil 45 are generated, and the movable magnetic field generator 35 is driven along axial directions of the VCM 100. Therefore the lens module, which is held in the core member 40 of the movable magnetic field generator 35, is driven along with the movable magnetic field generator 35 for achieving focusing and zooming functions etc.

It will be understood that the above particular embodiments are shown and described by way of illustration only. The principles and the features of the present disclosure may be employed in various and numerous embodiments without departing from the scope of the disclosure. The above-described embodiments illustrate the scope of the disclosure but do not restrict the scope of the disclosure.

What is claimed is:
1. A voice coil motor comprising:
a base comprising a first surface, the base defining a through hole in a center of the first surface, and a plurality of cavities surrounding the through hole;
a stationary magnetic field generator mounted on the base, and comprising a supporting frame and a plurality of permanent magnetic elements mounted on the supporting frame, the supporting frame defining a first receiving space therein, the magnetic elements being positioned around the first receiving space;
a moveable magnetic field generator moveably received in the first receiving space, the moveable magnetic field generator comprising a core member and a coil wrapped around the core member, the core member comprising a lower surface facing toward the first surface of the base, and a plurality of flanges extending downwards from the lower surface and spatially corresponding to and received in the cavities, respectively, each of the flanges comprising an end surface that is away from the lower surface, the end surface defining two sloped surfaces extending slantingly upward from a middle portion of the end surface to two opposite ends of the end surface, respectively; and
a case receiving the stationary magnetic field generator, the moveable magnetic field generator, and the base therein.
2. The voice coil motor of claim 1, wherein the supporting frame is substantially cuboid and comprises four longitudinal beams and eight latitudinal beams, each two corresponding upper and lower latitudinal beams are opposite to each other, and interconnect two corresponding adjacent longitudinal beams, the two longitudinal beams and the two latitudinal beams at each lateral side of the supporting frame cooperatively define a first receiving recess, and each first receiving recess is in communication with the first receiving space and receives a respective permanent magnetic element.

3. The voice coil motor of claim 1, wherein the case comprises an upper plate and four side plates, the upper plate is substantially rectangular shaped, the four side plates perpendicularly extending downwards from four sides of the upper plate, respectively, and the upper plate and the four side plates cooperatively form a receiving room.

4. The voice coil motor of claim 3, wherein the base further comprises four side walls perpendicular to and adjacent to the first surface, two of the side walls of the base are opposite each other, the other two side walls of the base are opposite each other, for one of the pairs of side walls of the base, each side wall defines a cutout, two of the side plates of the case oppose other, the other two side plates oppose each other, for one of the pairs of side plates, each side plate forms a projection perpendicularly protruding inwards into the receiving room, each of the projections spatially corresponds to a respective one of the cutouts, and each projection is snappingly received in the corresponding cutout.

5. The voice coil motor of claim 4, wherein the projections of the two opposing side plates are aligned with each other.

6. The voice coil motor of claim 4, wherein each projection is stamped inward from the corresponding side plate, whereby the projection defines a recess therein.

7. The voice coil motor of claim 1, further comprising a first elastic plate, wherein the first elastic plate is sandwiched between the base and the supporting frame.

8. The voice coil motor of claim 7, wherein four alignment posts perpendicularly extend upwards from the first surface, the first elastic plate defines four first locating holes spatially corresponding to the alignment posts, the supporting frame defines four lower alignment holes in a bottom surface thereof, the lower alignment holes spatially correspond to the alignment posts, and the first elastic plate is positioned on the base with the four alignment posts extending through the four first locating holes and being securely engaged in the four lower alignment holes.

9. The voice coil motor of claim 8, further comprising a second elastic plate and a bracket, wherein the second elastic plate is sandwiched between the bracket and the supporting frame.

10. The voice coil motor of claim 9, wherein the supporting frame comprises four upper alignment posts extending upward from four corners of a top surface thereof, the second elastic plate defines four second locating holes at four corners thereof, the four second locating holes spatially correspond to the upper alignment holes, the bracket defines four upper alignment holes at four corners thereof, the upper alignment holes pass through the bracket and spatially correspond to the upper alignment posts, and the four upper alignment posts extend through the four second locating holes and are securely engaged in the four upper alignment holes of the bracket.

11. The voice coil motor of claim 10, wherein the first elastic plate defines a first light passing hole at the center thereof.

12. The voice coil motor of claim 11, wherein the second elastic plate defines a second light passing hole at the center thereof.

13. The voice coil motor of claim 12, wherein each of the first elastic plate and the second elastic plate comprises an elastic portion, and the elastic portion defines a plurality of slots.

14. The voice coil motor of claim 1, wherein each of the cavities communicates with the through hole.

15. The voice coil motor of claim 1, wherein the two sloped surfaces are symmetrical.

16. The voice coil motor of claim 1, wherein an angle of each sloped surface is in the range of from 5 degrees to 45 degrees, as measured relative to a plane that is parallel to the lower surface.

17. A voice coil motor comprising:
a base comprising a first surface, the first surface defining a plurality of cavities;
a stationary magnetic field generator mounted on the first surface, and comprising a supporting frame, the supporting frame defining a first receiving space;
a moveable magnetic field generator moveably received in the first receiving space, and comprising a core member, the core member comprising a lower surface, and a plurality of flanges extending downwards from the lower surface and received in the cavities, respectively, each of the flanges comprising an end surface that is away from the lower surface, the end surface defining two sloped surfaces respectively extending slantingly upward from a middle portion of the end surface to two opposite sides of the flange.

18. The voice coil motor of claim 17, further comprising a case, wherein the case receives the stationary magnetic field generator, the moveable magnetic field generator.

19. The voice coil motor of claim 17, wherein an angle of each sloped surface is the range of from 5 degrees to 45 degrees, as measured relative to a plane that is parallel to the lower surface.

20. The voice coil motor of claim 17, wherein the supporting frame is substantially a cuboid frame and comprises four longitudinal beam and eight latitudinal beam, each two corresponding upper and lower latitudinal beam are opposite to each other, and interconnect two corresponding adjacent longitudinal beam, the two longitudinal beams and the two latitudinal beam at each lateral side of the supporting frame cooperatively define a first receiving recess, each of the first receiving recess is in communication with the first receiving space and receives a respective permanent magnetic element.

* * * * *